Figure 4:
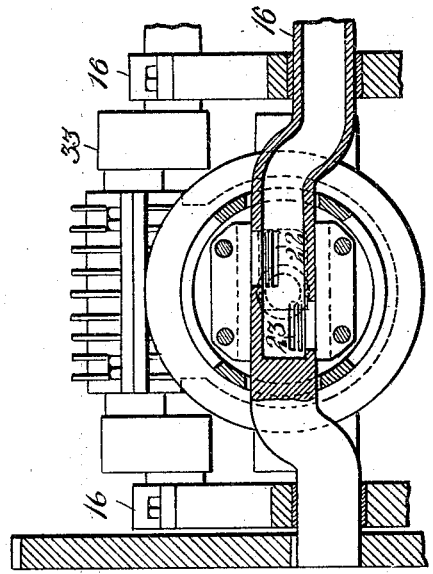

P. J. M. SULLIVAN.
INTERNAL COMBUSTION ENGINE.
APPLICATION FILED JULY 14, 1917. RENEWED OCT. 31, 1918.
1,287,510.
Patented Dec. 10, 1918.
2 SHEETS—SHEET 1.
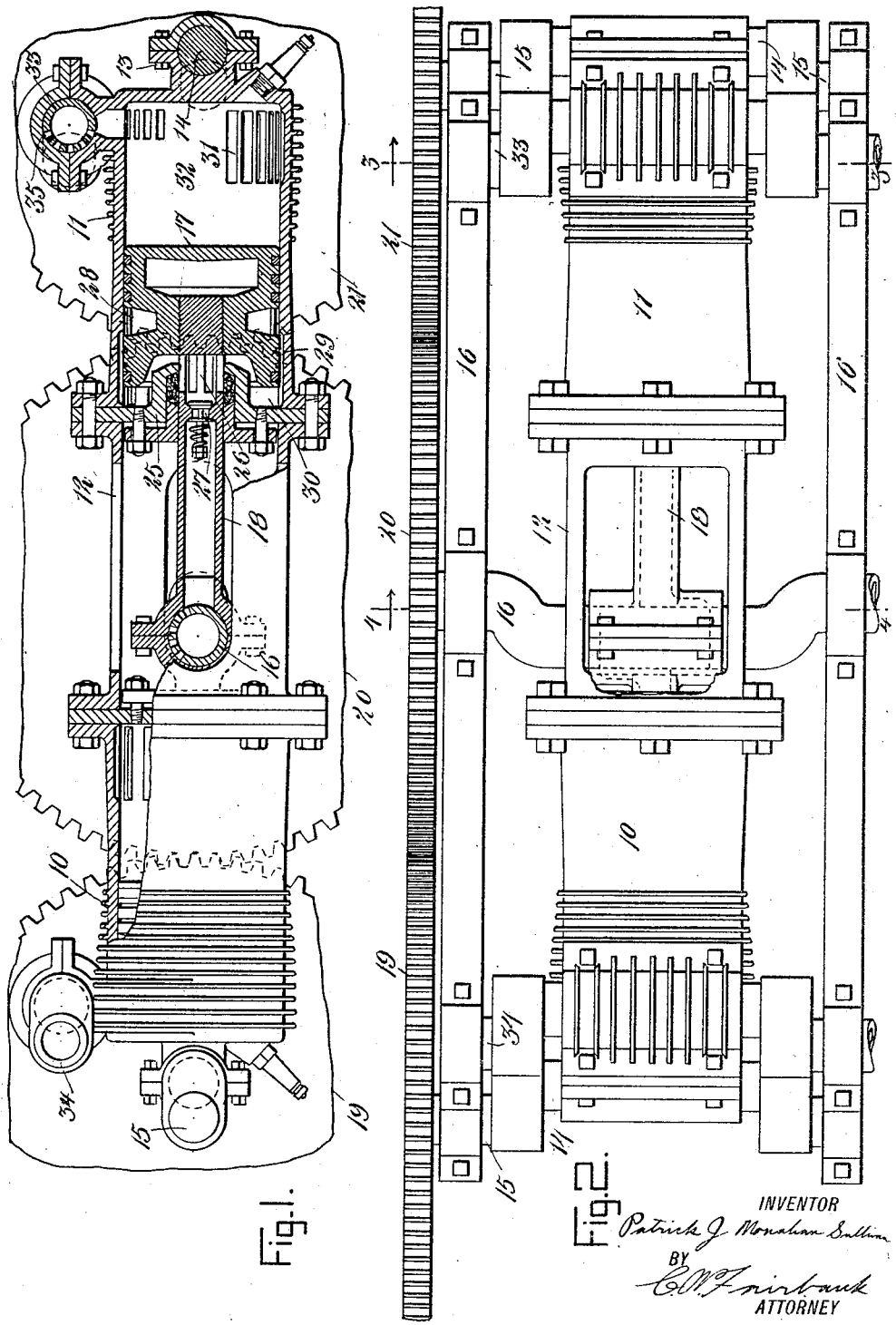

P. J. M. SULLIVAN.
INTERNAL COMBUSTION ENGINE.
APPLICATION FILED JULY 14, 1917. RENEWED OCT. 31, 1918.

1,287,510.

Patented Dec. 10, 1918.

INVENTOR
Patrick J. Monahan Sullivan
BY
his ATTORNEY

UNITED STATES PATENT OFFICE.

PATRICK JOHN MONAHAN SULLIVAN, OF WOODCLIFFE-ON-HUDSON, NEW JERSEY, ASSIGNOR TO MONAHAN ROTARY ENGINE CORPORATION, OF NEW YORK, N. Y., A CORPORATION OF NEW YORK.

INTERNAL-COMBUSTION ENGINE.

1,287,510.   Specification of Letters Patent.   Patented Dec. 10, 1918.

Application filed July 14, 1917, Serial No. 180,490. Renewed October 31, 1918. Serial No. 260,543.

*To all whom it may concern:*

Be it known that I, PATRICK JOHN MONAHAN SULLIVAN, a citizen of the United States, and resident of Woodcliffe-on-Hudson, in the county of Bergen and State of New Jersey, have invented certain new and useful Improvements in Internal-Combustion Engines, of which the following is a specification.

This invention in some of its main features is designed primarily for use in the general type of engine disclosed in my prior co-pending application, Serial No. 101,011, filed June 1, 1916, of which this application is in part a continuation and in my Patents 1,274,811, 1,274,812, and 1,274,813 issued Aug. 6, 1918. In that type of engine the cylinder and piston are so mounted, preferably on cranks, that they always remain in parallelism with an initial position but bodily move in opposite directions along circular paths. The relative reciprocatory movement of the piston and cylinder is effected by this opposite rotation and every movable part travels along a circular path so that there is no loss in energy by bringing any part to a dead stop at the end of a stroke as in the common type of stationary cylinder engine.

As an important feature of my invention I connect the two separate cranks, which support the cylinder or cylinders, at opposite ends and spaced apart to a distance approximately equal to the total effective length of the cylinder construction instead of mounting them at opposite sides of the cylinder intermediate of the ends of the latter as shown in my Patents 1,274,812 and 1,274,813. This supporting of the bodily movable cylinder at points spaced so far apart has the advantage of reducing the strain resulting from any tendency of the cylinder to tilt or swing in respect to the cranks.

As a further important feature of my invention, I provide the piston with a chamber or space in which compressed gas may be stored during the exhaust stroke and delivered to the firing chamber already compressed and just prior to the ignition of the charge.

A further important feature of my invention relates to the inlet and exhaust valve construction whereby the supply to and the exhaust from the engine is controlled by the relative movement of the cylinder in respect to the cranks.

A further important feature of my invention involves the use of the piston rod as a means for delivering the charge to the cylinder during the bodily movement of the cylinder and piston.

Merely as an example of my invention, I have illustrated one embodiment in the accompanying drawings, but various changes may be made in this construction and within the scope of my invention without departing from the spirit thereof. In these drawings, to which reference is to be had and in which similar reference characters indicate corresponding parts in the several views, Figure 1 is a side elevation, a portion being shown in central longitudinal section;

Fig. 2 is a top plan view, and

Figure 3:
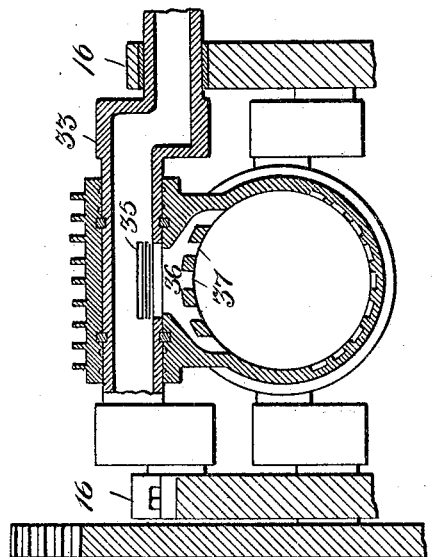

Figs. 3 and 4 are transverse sections on the lines 3—3 and 4—4 respectively of Fig. 2.

In the specific form illustrated, I provide a cylinder construction including two cylinders 10 and 11 in alinement with each other and either of such length that they may be rigidly connected or of shorter length and connected and spaced by an intermediate frame or skeleton 12. Each cylinder head has a bearing 13 extending transversely thereof and receiving the crank 14 of a crank shaft 15 journaled in main frame members or a base 16. The two crank shafts 15 have their cranks 14 of the same throw and extend in the same direction. By the simultaneous rotation of these two cranks in the same direction, the entire cylinder construction is given a bodily, rotary, or planetary movement, but the axis of the cylinders remains at all times parallel with an initial position.

Midway between the two crank shafts 15 is a third crank shaft 16 having a crank of the same throw as the cranks 14. When the cranks are on dead center, this crank extends in the opposite direction to the cranks 14 and its shaft is mounted for rotation in the opposite direction.

Within each cylinder is a piston 17 having its piston rod 18 connected to the crank of the shaft 16. The two piston rods may be rigidly connected and may abut to form a bearing therebetween for the crank so that the two pistons and their rods are always rigid in respect to each other. To insure the desired simultaneous rotation of the three cranks, I may provide the three shafts with intermeshing gears 19, 20 and 21. This train of gears may lie in the same plane and, as the two gears 19 and 21 on the shafts 15 mesh with the gear 20 on the shaft 16, it is evident that they will rotate in the same direction, but that the gear 20 will rotate in the opposite direction. Any other suitable means might be employed for insuring this rotation of the shafts. For instance, each gear might be made of only one-third the size illustrated and a pair of gears might be inserted between 19 and 20 and another pair between 20 and 21. Either the gear 19 or the gear 21 might be entirely omitted as the cylinder construction constitutes a rigid connection between the cranks of the two end crank shafts and this will insure the simultaneous and equal rotation of the crank shafts 15.

The pistons, cylinders, and mountings therefor, by proper designing, might serve as a double-ended two-cycle engine, or as a double-ended four cycle engine, or one cylinder might serve as the compression space for the charge. So far as the cylinder and piston mounting is concerned, I claim my invention broadly, irrespective of the particular method or principle of gas introduction, compression, firing and exhaust.

As an important feature of my invention, I utilize the crank shaft 16 as a supply conduit for explosive mixture and utilize its connection to the piston rods as a controlling valve. As shown particularly in Fig. 4, the crank shaft 16 is hollow and at one end may be connected to a source of explosive mixture. In its periphery, it has two separate sets of ports 22 and 23 each extending partway around the periphery, one set of ports being spaced 180° from the other. The two sets of ports are at opposite sides of the medial plane of the cylinders at right angles to the axis of the shafts and one piston rod has its passage communicating only with one set of ports and the other one with the other set of ports as is indicated by dotted lines in Fig. 2. The ports are so positioned that as the crank shaft rotates within the bearing formed by the end portions of the piston rods, one set of ports will open to permit the passage of explosive mixture from the crank shaft into one piston rod when the latter is approximately at one end of its stroke as shown in Fig. 1, and the other set of ports will open to supply to the other piston rod, when the cranks have rotated 180° and the pistons have moved a length corresponding to one stroke.

Thus, the pistons are alternately put in communication with the source of fuel supply at the beginning of the suction stroke and the communication is shut off at the end of the suction stroke and at the beginning of the compression stroke.

For effecting the compression of the charge and the delivery of it to the cylinder, I preferably form the pistons and cylinders as shown in Fig. 1, but this construction might be employed in connection with a stationary cylinder engine which does not embody my improved rotary type above described. As shown, each cylinder has a cylinder head 25 provided with a packing through which the piston rod 18 may extend. The piston rod has ports 26 whereby the space between the piston 17 and the cylinder head 25 are always in communication with the interior of the piston rod although preferably the piston rod has a check valve 27 therein which will prevent the return flow of gas from the chamber toward the opposite end of the crank shaft 16.

The piston is provided with a chamber 28 preferably in the periphery thereof and between separate sets of piston rings. The cylinder itself is provided with grooves, by-passes or passages 29 extending lengthwise thereof, adjacent to the cylinder head 25, so that when the piston reaches the end of its stroke as shown in Fig. 1, the compression chamber, or space 30 between the piston and the cylinder, can communicate with the chamber 28 hereinafter designated as the storage or transporting chamber. When these passages open by the arrival of the piston at the proper position, gas immediately rushes from the chamber 30 to the chamber 28 to neutralize the pressure in the two. By properly selecting the relative sizes of these two chambers, the desired amount of gas may be compressed and delivered to the chamber 28 and will be trapped therein as the piston starts on its return stroke and closes the passages 29.

Adjacent to the opposite end of the cylinder is a set of somewhat similar passages, by-passes or ports 31, which are so positioned that they will connect the chamber 28 with the firing chamber 32 when the piston arrives at the proper position, at the end of the exhaust stroke. This will permit the rapid transfer of the gas under its own pressure from the storage and transporting chamber 28 to the firing chamber 32 when the piston is in such position as to receive the impulse of the exploding gas upon the ignition of the latter in the firing chamber.

It will thus be seen that during a movement of the piston in one direction, for instance during the power stroke, gas will be compressed in the chamber 30 and, at the end of the stroke, will be transferred to the chamber 28. During the return or exhaust stroke, a second charge will be drawn into the chamber 30 and the compressed charge will be carried up to the ports 31 ready for delivery into the firing chamber at the completion of the exhaust stroke and at, or before, the beginning of the next power stroke. The engine is thus a complete scavenging two-cycle engine and there is little, or no, liability of any material mixing of the exhaust gas with the incoming charge.

For controlling the escape of the exhaust gas, I preferably provide two additional crank shafts 33 and 34, one adjacent to the outer end of each cylinder. These crank shafts are hollow to constitute exhaust conduits and are provided with a series of ports 35, as shown particularly in Figs. 1 and 3. The ports are so positioned that when the piston reaches the end of its power stroke, for instance the position shown in Fig. 1, the first of the ports 35 will communicate with the passage 36 leading to a series of exhaust ports 37 in the wall of the firing chamber. As the piston travels up on its exhaust stroke, the exhaust gas will be forced out through the ports 35 and the relative movement of the exhaust conduit shaft and its bearing and the position of the ports 35 are such that at the end of the exhaust stroke, the last of the ports 35 will just close with the side of the bearing and the fresh charge, which is admitted about this time, cannot escape through the exhaust or, at most, can only force out the balance of the exhaust gas before the exhaust port will close.

To prevent any leakage along the exhaust crank shaft during the power stroke, the shaft itself may be provided with packing rings, gaskets, or flanges in its periphery, as indicated in Fig. 3. To keep the ports cool, the casing surrounding the exhaust conduit shaft may have radiating fins or flanges similar to those which may be employed on the body of the cylinder.

By the bodily movement of the cylinder and its connected parts through the air during the operation of the engine, an automatic circulation of air is maintained and a more efficient cooling is secured than is possible in an air cooled stationary cylinder engine. The exhaust conduit cranks necessarily have the same throw as the cranks of the shafts 15 and are forced to rotate in the same direction with their cranks always in parallelism. With an efficient system of lubrication of the exhaust conduit cranks 33 and 34 these two cranks may serve as the cranks for supporting and controlling the movement of the cylinders and the crank shafts 15 may be entirely eliminated, but in practice, I prefer to support the main weight of the cylinders by the crank shafts 15 which are maintained reasonably cool and which may be adequately lubricated, while the crank shafts 33 and 34 support little or no weight and a rise in temperature by the action of the exhaust gas is less liable to interfere with the efficient operation of the engine.

Among the many advantages of my improved construction, it will be noted that there is no reciprocating motion, no loss of power by the stopping of pistons at the ends of their strokes and no loss of power from jarring, vibration, and recoil. The cooling is directly proportional to the speed developed as the cylinders move bodily through the air which is used for cooling. The cranks have a throw of only one-quarter of the stroke instead of one-half, as the cylinders themselves are simultaneously moving in the opposite direction to the direction of movement of the piston. This permits of a stronger and better supported shaft with less strain from centrifugal force.

Having thus described my invention, what I claim as new and desire to secure by Letters Patent is:

1. An internal combustion engine, including a pair of rigidly connected cylinders, a pair of rigidly connected pistons therein, a pair of crank shafts having equal throw cranks, one connected to one end of one cylinder and the other connected to the opposite end of the other cylinder, a third crank shaft having its crank connected to said pistons, and means for insuring the rotation of the first mentioned crank shafts in one direction and the other crank shaft in the opposite direction.

2. An internal combustion engine, including a pair of cylinders in alinement with each other and rigidly connected, a bearing upon the outer cylinder heads, a pair of crank shafts having their cranks secured in said bearings whereby upon the simultaneous rotation of said crank shafts in the same direction, said cylinders are given a planetary movement, a pair of pistons within said cylinders, and a crank shaft having its crank connected to said pistons and mounted for rotation in a direction opposite to that of the first mentioned crank shafts.

3. An internal combustion engine, including a pair of cylinders in axial alinement and rigidly connected, a pair of rotary conduits having crank portions provided with ports, connections between each cylinder and the crank portion of the corresponding conduit, a pair of pistons within said cylinders, and means for effecting a relative reciprocatory movement of said cylinders and pistons during a planetary movement of said cylinders.

4. An internal combustion engine, including a pair of rigidly connected opposed cylinders, a pair of pistons, a pair of piston rods rigidly connected to each other and rigidly connected to said pistons, said piston rods having passages extending lengthwise thereof and communicating with said cylinders, and a hollow crank shaft having a crank connected to said pistons and having separate sets of ports communicating with the separate passages in said piston rods.

5. An internal combustion engine, including a cylinder provided with two sets of by-passes extending lengthwise thereof, one adjacent to one end and the other adjacent to the other end, a piston having a compressed gas storage chamber therein adapted to communicate with one end of said cylinder through one set of by-passes when the piston is adjacent to that end of the cylinder and adapted to communicate with the opposite end of the cylinder through the other set of by-passes when the piston is adjacent to the last mentioned cylinder end.

6. An internal combustion engine, including a cylinder, a piston therein, a pair of parallel crank shafts having equal throw cranks, one connected to and supporting one end of the cylinder and the other connected to and supporting the opposite end of the cylinder, a third crank shaft intermediate of the other two and in the same plane and having its crank connected to said piston, and means for insuring a rotation of the first mentioned crank shafts in one direction and the other crank shaft in the opposite direction.

7. An internal combustion engine, including a double ended cylinder, separate bearings upon the opposite cylinder heads, a pair of crank shafts having their cranks secured in said bearings for supporting said cylinder, a double ended piston, and a third crank shaft having its crank connected to said piston.

8. An internal combustion engine, including a pair of rigidly connected opposed cylinders, a pair of pistons, a pair of piston rods rigidly connected to each other and rigidly connected to said pistons, said piston rods having passages extending lengthwise thereof and communicating with said cylinders, and a hollow crank shaft having a crank connected to said piston rods and communicating with the passages therein.

9. In combination, a cylinder, a crank connected thereto adjacent to one end, a separate crank connected thereto adjacent the opposite end, a piston, a crank connected to said piston, one of said cranks having a passage therethrough serving as an inlet passage to said cylinder, and another of said cranks having a passage therethrough serving as an outlet passage from said cylinder.

10. In combination, a cylinder, a pair of cranks connected thereto, said cylinder being movable bodily along a circular path and maintaining its axis in parallelism with an initial position, a piston within said cylinder, a piston rod therefor, and a crank connected to said piston rod, said last mentioned crank and said piston rod having passages therethrough for the admission of motive fluid to the cylinder.

Signed at New York, in the county of New York, and State of New York, this 9th day of July, A. D. 1917.

PATRICK JOHN MONAHAN SULLIVAN.

Copies of this patent may be obtained for five cents each, by addressing the "Commissioner of Patents, Washington, D. C."